United States Patent
Betts et al.

[11] Patent Number: 6,157,680
[45] Date of Patent: Dec. 5, 2000

[54] AUDIO DISTORTION CANCELER METHOD AND APPARATUS

[75] Inventors: William L. Betts, St. Petersburg; Gordon Bremer, Clearwater, both of Fla.

[73] Assignee: Paradyne Corporation, Largo, Fla.

[21] Appl. No.: 09/034,508

[22] Filed: Mar. 4, 1998

Related U.S. Application Data

[60] Provisional application No. 60/039,860, Mar. 5, 1997.

[51] Int. Cl.[7] .............................. H04B 15/00; H04L 5/16
[52] U.S. Cl. .......................... 375/285; 375/219; 379/410
[58] Field of Search ...................... 375/219, 222, 375/285, 346, 350, 229, 230; 370/286; 379/93.1, 410, 411

[56] References Cited

U.S. PATENT DOCUMENTS

| | | | |
|---|---|---|---|
| 5,095,497 | 3/1992 | Aman et al. | 375/285 |
| 5,148,427 | 9/1992 | Buttle et al. | 379/411 |
| 5,162,812 | 11/1992 | Aman et al. | 375/346 |
| 5,247,512 | 9/1993 | Sugaya et al. | 370/286 |
| 5,297,163 | 3/1994 | Pfeiffer | 375/222 |
| 5,315,585 | 5/1994 | Iizuka et al. | 379/410 |
| 5,526,377 | 6/1996 | Yedid et al. | 375/350 |
| 5,623,513 | 4/1997 | Chow et al. | 375/285 |
| 6,011,814 | 1/2000 | Martinez et al. | 375/233 |
| 6,026,120 | 2/2000 | Betts | 375/219 |

*Primary Examiner*—Tesfaldet Bocure
*Attorney, Agent, or Firm*—Thomas, Kayden, Horstemeyer & Risley LLP

[57] ABSTRACT

In a communications environment where it is desirable to allow the simultaneous transmission of digital data and conventional voice on a single communication line, an audio distortion canceler method and apparatus is configured to adaptively cancel the nonlinear low frequency audible harmonic distortion caused by a device, such as a conventional telephone, connected to the communication line. The method and apparatus of the present invention has application where a harmonic distortion signal resides in a region of the frequency spectrum that is apart from that of the transmit spectrum.

24 Claims, 7 Drawing Sheets

AUDIO DISTORTION CANCELER METHOD AND APPARATUS

CROSS REFERENCE TO RELATED APPLICATION

This application claims priority to and the benefit of the filing date of commonly assigned provisional application entitled AUDIO DISTORTION CANCELER, assigned Ser. No. 60/039,860, filed Mar. 5, 1997, and hereby incorporated by reference.

FIELD OF THE INVENTION

The present invention relates generally to communication devices, and more particularly, to a method and apparatus for the cancellation of non-linear audio distortion on a remote communication line.

BACKGROUND OF THE INVENTION

In the field of data communications, a modem is used to convey information from one location to another. Digital Subscriber Line (DSL) technology now enables modems, or DSL devices, to communicate large amounts of data. Typically in a communications environment a single copper wire pair is used to convey both digital data and analog voice information, such as in the case of a digital subscriber line providing both digital data service and conventional voice service, to a residential or a business location.

The DSL device is typically connected to the local loop (the copper wire provided by the local telephone company serving the remote location), or communications channel, through a conventional hybrid transformer. In this arrangement, a splitter, typically known in the field of telephony communications as a Plain Old Telephone Service (POTS) splitter, is installed at the remote location to allow the connection of a conventional telephone to the communication line. A POTS splitter may also be installed at a central office location. A POTS splitter isolates the communication line from most low frequency harmonic distortion components introduced by, for example, a conventional telephone connected to the communication line. A POTS splitter, however, adds cost and complexity and is typically failure prone. Eliminating the POTS splitter, however, may permit audible harmonic distortion, caused by, for example, a conventional telephone connected to the line, to enter the communication path, thus degrading the digital data service and causing audible interference to the voice service. Heretofore, there has been no way to cancel the audible harmonic distortion without the use of a device such as a POTS splitter.

Thus, it is desirable to adaptively cancel, within a DSL device, the non-linear out of band audible harmonic distortion caused by a conventional telephone, or other device, connected to a remote communication line.

SUMMARY OF THE INVENTION

In a communications environment where it is desirable to allow the simultaneous transmission of digital data and conventional voice on a single remote DSL line, the audio distortion canceler method and apparatus adaptively cancels non-linear low frequency audible harmonic distortion caused by a device, such as a conventional telephone connected to a communication line. The method and apparatus of the present invention illustratively has application where a harmonic distortion signal resides in a region of the frequency spectrum that is out of the band of the transmit spectrum, commonly referred to as out of band.

The audio distortion canceler can be conceptualized as a method for eliminating audible harmonic distortion in a communication device comprising the following steps. First, a transmit signal is supplied to a modulator, the modulator designed to supply a modulated output. This modulated output is then supplied to a non-linear device. Next the output of the non linear device is supplied to an echo canceler, the echo canceler designed to develop an echo replica signal.

Next, a received signal containing distortion is supplied to a first filter, the filter designed to develop an error signal. The echo canceler is then updated using the error signal developed by the first filter. The updated echo canceler signal is then filtered by a second filter, and the updated echo replica signal is subtracted from the output of the modulator to obtain an error corrected signal.

The echo canceler can operate at or below the sample rate of the modulator. Optionally, the output of the non-linear device is supplied to an additional filter designed to reduce the speed of the echo cancelers by reducing the sample rate of the echo canceler. To cancel low frequency audible harmonic distortion, the filters can illustratively be low pass filters.

The audio distortion canceler can also be embodied as an apparatus for eliminating audible harmonic distortion in a communication device, comprising a modulator having a modulated output, a non-linear device configured to receive the output of the modulator, an echo canceler configured to receive the output of the non-linear device and output an echo replica signal. A first filter is configured to supply an error signal to the echo canceler, and a second filter is configured to filter the output of the echo canceler. A subtractor is configured to subtract the output of the second filter from the output of the modulator.

Optionally, a third filter is included to reduce the speed of the echo cancelers by reducing the sample rate of the echo canceler. To cancel low frequency audible harmonic distortion, the filters can illustratively be low pass filters.

The invention has numerous advantages, a few of which are delineated hereafter, as merely examples.

An advantage of the present invention is that it enables the adaptive cancellation, in a communication device, of the low frequency audible harmonic distortion caused by a device located on a communication line.

Another advantage of the present invention is that it eliminates the requirement that a POTS splitter be installed at a DSL location.

Another advantage of the present invention is that because it can operate at a sample rate below the symbol rate of the transmitter, it reduces the load on the systems processor, thus conserving system resources.

Another advantage of the present invention is that it is simple in design, reliable in operation, and its design lends itself to economical mass production in DSL devices.

Other features and advantages of the present invention will become apparent to one with skill in the art upon examination of the following drawings and detailed description. For example, by adapting the parameters of the non-linear devices, echo cancelers, and filters, the audio distortion canceler method and apparatus can suppress or eliminate any out of band distortion. It is intended that all such additional features and advantages be included herein within the scope of the present invention, as defined in the appended claims.

BRIEF DESCRIPTION OF THE DRAWINGS

The present invention, as defined in the claims, can be better understood with reference to the following drawings.

The drawings are not necessarily to scale, emphasis instead being placed on clearly illustrating the principles of the present invention.

DETAILED DESCRIPTION OF THE PREFERRED EMBODIMENT

The present invention can be implemented in software, hardware, or a combination thereof. In the preferred embodiment, the elements of the present invention are implemented in software that is stored in a memory and that configures and drives a suitable digital signal processor (DSP) situated in the respective modem. However, the foregoing software can be stored on any computer-readable medium for use by or in connection with any suitable computer-related system or method. In the context of this document, a computer-readable medium is an electronic, magnetic, optical, or other physical device or means that can contain or store a computer program for use by or in connection with a computer-related system or method.

Furthermore, while described hereinafter as operating on the low frequency audible harmonic distortion caused by a conventional telephone, or other device, connected to the communications channel, the audio distortion canceler method and apparatus can effectively suppress or cancel any distortion present out of the transmit frequency band.

Architecture

Figure 1:
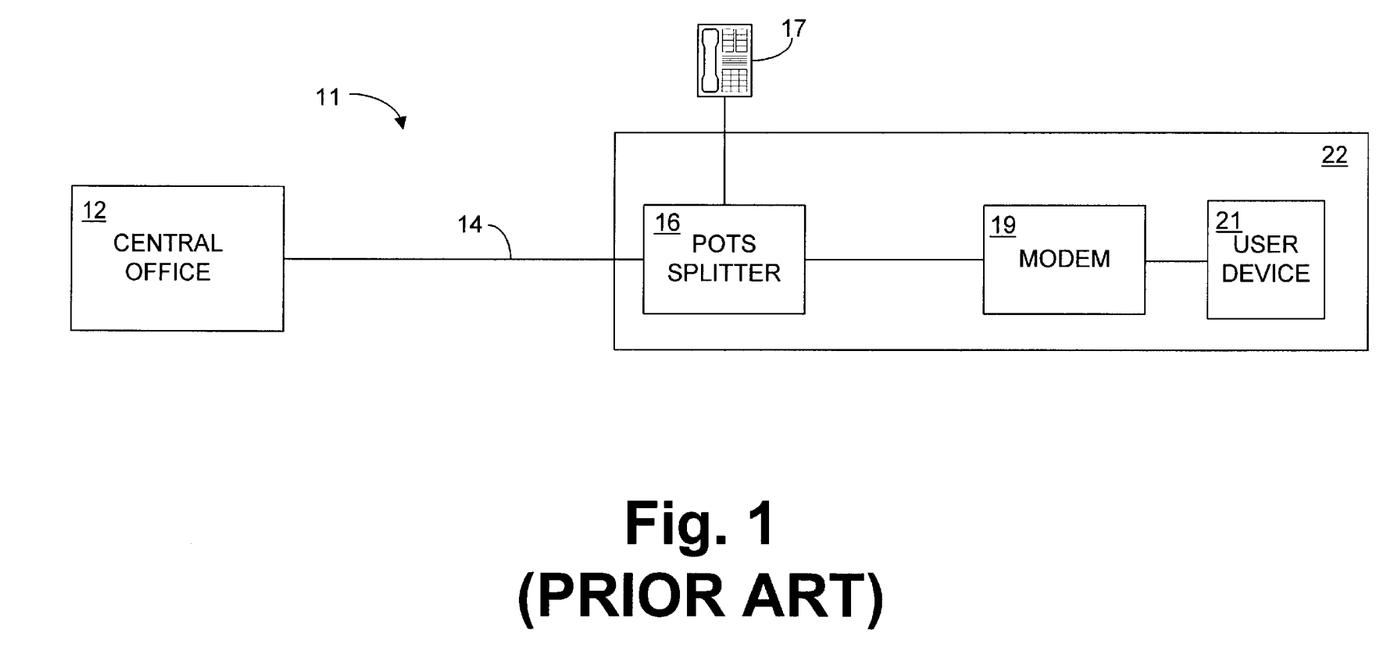
FIG. 1 is a schematic view illustrating a prior art communications environment in which a POTS splitter is employed to connect a telephone to the communications channel.

Referring now to FIG. 1, shown is a prior art communications environment 11 in which a POTS splitter 16 is employed to connect a telephone 17 to the communications channel 14. Communications channel 14 is a conventional copper wire pair that typically connects a telephone company central office location 12 to a remote user location 22. Remote user location 22 is typically a residential or business location and includes modem 19 and user device 21. POTS splitter 16 is required in this application in order to isolate communications channel 14 from interference and noise produced by telephone 17, and to separate the low frequency telephony information from the data present on channel 14.

Figure 2:
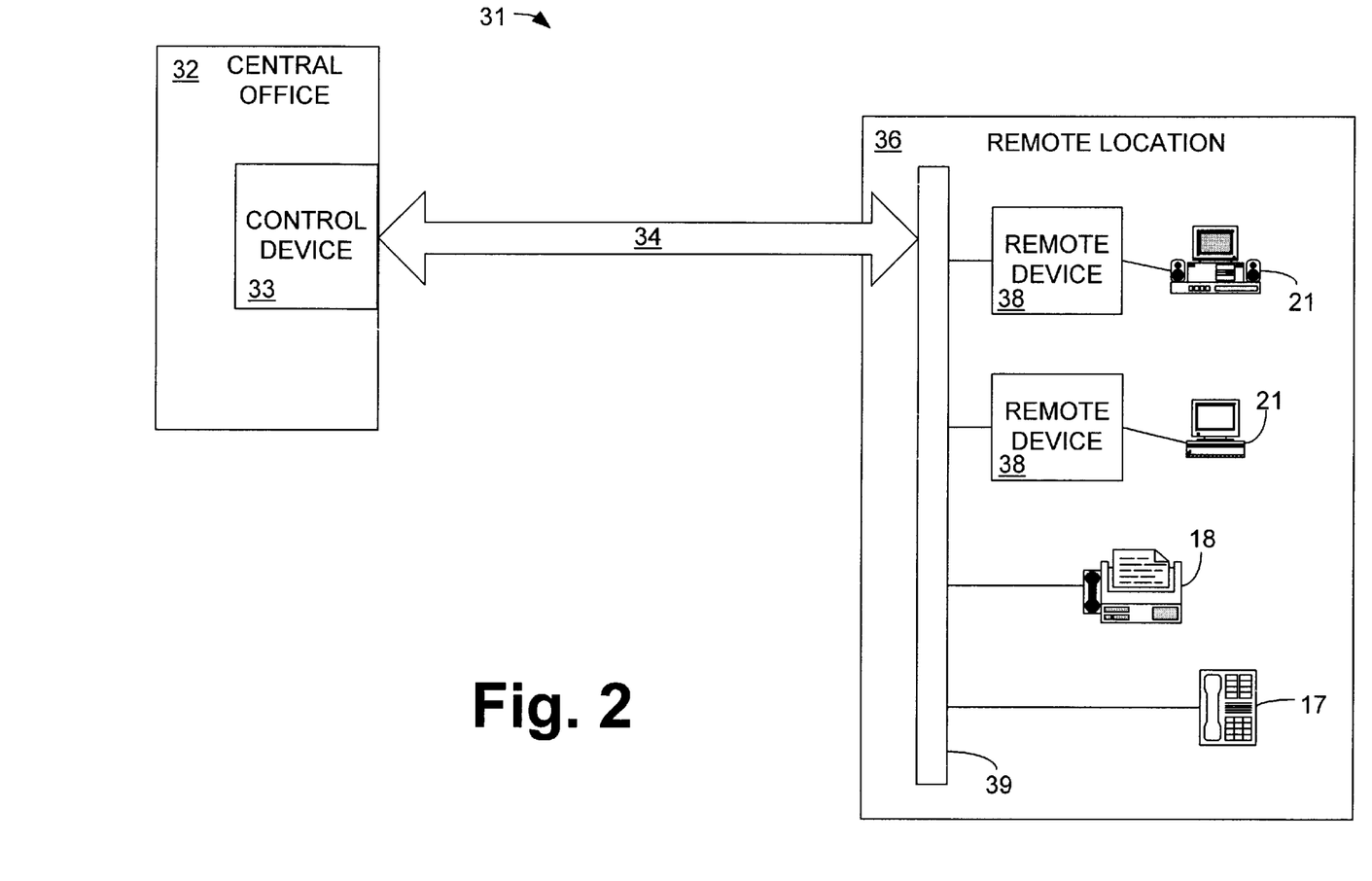
FIG. 2 is a schematic view of a multipoint communications environment including DSL devices employing the audio distortion canceler method and apparatus of the present invention.

POTS splitter 16 routes the telephony information to telephone 17 while allowing the remaining data on channel 14 to pass to modem 19 and on to user device 21, which can illustratively be a computer, fax machine, or the like. POTS splitter 16 is typically located at remote location 22. FIG. 2 is a schematic view of a multipoint communications environment 31 in which communication devices employing the audio distortion canceler method and apparatus of the present invention operate.

Remote location 36 is connected to central office location 32 via communication channel 34. In the preferred embodiment, control device 33 and remote devices 38 are illustratively digital subscriber line (DSL) communication devices. However, the concepts of the audio distortion canceler method and apparatus are applicable to various other types of communication devices employing adaptive receiver parameters.

Located at central office location 32 is control device 33. Communication channel 34 is typically the copper wire pair that extends between a telephone company central office and a remote residential, business, or any other location served by local telephone service. Remote location 36 may contain a plurality of remote devices 38 connecting a plurality of user devices 21 to communication channel 34 via communication bus 39. Communication bus 39 is illustratively the copper wiring infrastructure used throughout a remote location to connect remote devices 38 to communication channel 34. In addition, remote location 36 may contain user devices 18 and 17 that are connected directly to communication bus 39, which in turn is connected to communication channel 34. Illustratively, fax device 18 and conventional telephone 17 are connected to communication bus 39, and thus to communication channel 34. It is desirable to connect the telephone 17 directly to communication bus 39 without the use of a POTS splitter, however, as mentioned above, this may introduce unwanted audio distortion to communication channel 34.

Typically, control device 33 will transmit signals to remote devices 38 over communications channel 34. Similarly remote devices 38 will transmit signals to control device 33.

By using remote devices 38 employing the concepts and features of the audio distortion canceler method and apparatus, it is possible to connect directly telephone 17 to communication channel 34 without experiencing audible distortion.

Figure 3:
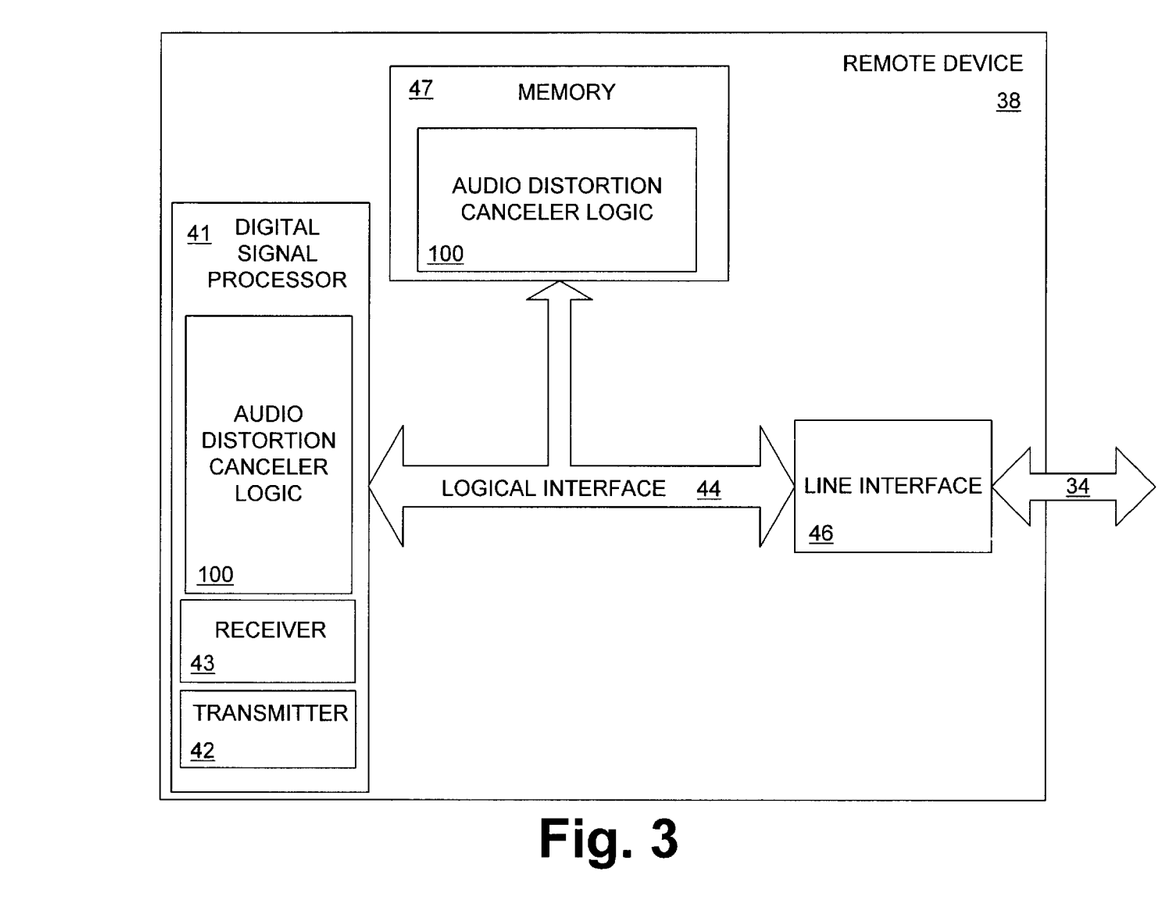
FIG. 3 is a schematic view of a DSL device of FIG. 2 employing the audio distortion canceler logic of the present invention.

Now referring to FIG. 3, shown is a schematic view illustrating remote device 38 of FIG. 2, including the audio distortion canceler logic 100 of the present invention.

The concepts and features of the present invention can reside in either control device 33 or remote device 38, however, for simplicity, the present invention will be described with reference to remote device 38.

Remote device 38 contains audio distortion canceler logic 100 which enables the remote device to suppress or eliminate unwanted non-linear low frequency audible harmonic distortion caused by a conventional telephone 17 connected to communication channel 34 through communication bus 39.

Still referring to FIG. 3, remote device 38 contains conventional components as is known in the art of data communications. Digital Signal Processor (DSP) 41 controls the operation of, and includes control device's transmitter 42 and receiver 43 and couples to line interface 46 over logical interface 44 to gain access to communications channel 34. Also included in DSP 41 of remote device 38 is audio distortion canceler logic 100, which enables remote device 38 to more reliably and robustly suppress or cancel unwanted non-linear low frequency audible harmonic distortion caused by a conventional telephone 17.

Also contained within remote device 38 is memory 47, which also includes audio distortion canceler logic 100. In a preferred embodiment, the logic of the present invention is executed within DSP 41 and is therefore shown as residing in both memory 47 and in DSP 41. Furthermore, while depicted as discrete components, remote device 38 may illustratively be contained within DSP 41, i.e. DSP 41 can perform all the functionality of remote device 38.

Figure 4:
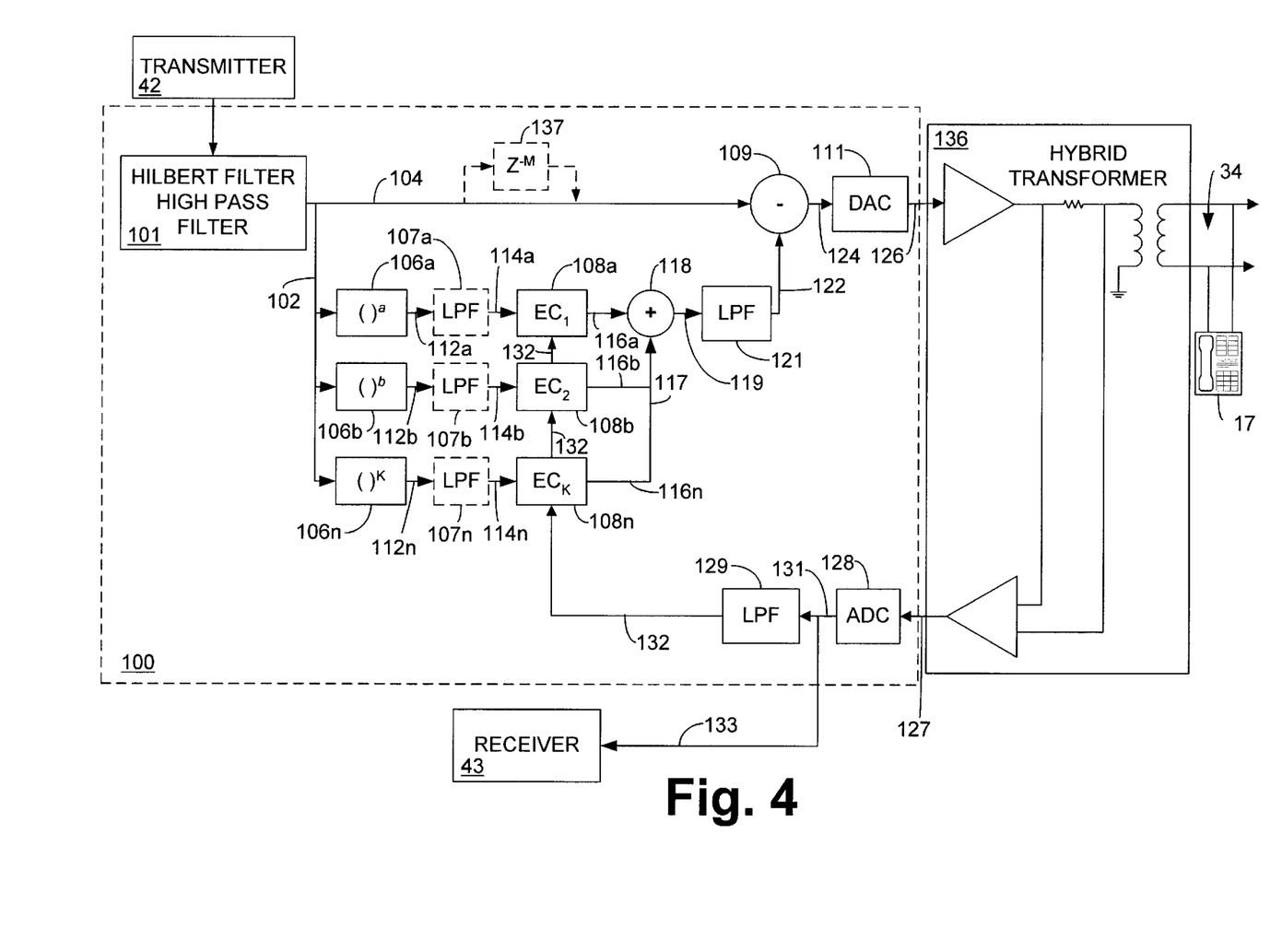
FIG. 4 is a block diagram view of the audio distortion canceler apparatus of the DSL device of FIG. 3.

Referring now to FIG. 4, shown is a schematic view of the audio distortion canceler apparatus 100 of remote modem 38.

Transmitter 42 is arranged such that it provides a signal to Hilbert filter 101. It is important to note that while Carrierless Amplitude/Phase (CAP) modulation is presented in this preferred embodiment, other modulation schemes, such as for example, quadrature amplitude modulation (QAM), pulse amplitude modulation (PAM), or many other modulation schemes can benefit from the concepts of the present invention, and all are contemplated herein.

Connected at the output of Hilbert filter 101 on line 102 are a plurality of non-linear devices 106a–106n. Non-linear devices 106 operate on the Hilbert filter 101 output with a non-linear operator. For example, non-linear device 106a might square the Hilbert filter 101 output to obtain the harmonic content of the signal, which would produce intermodulation products in the low frequency band where they are audible. Similarly, non-linear device 106b might cube the Hilbert filter 101 output, or provide a non-linear transfer function. Furthermore, it is possible to have a non-linear function, such as a curve, applied to the Hilbert filter 101 output. It is possible to have K non-linear operators, depending upon the amount of non-linear processing desired.

The output of non-linear devices 106a–106n are supplied to optional low pass filters (LPF) 107a–107n. Low pass filters 107 are designed to reduce the sample rate of the Hilbert filter 101 output, thus enabling echo cancelers 108 to run at a reduced sample speed. This in turn allows echo cancelers 108 to have a reduced number of taps.

The reduced sample rate signal on lines 114a–114n are then supplied to echo cancelers 108a–108n. Echo cancelers 108 are illustratively finite impulse response (FIR) filters that, among other operations, delay the non-linear signal supplied thereto. Echo cancelers 108 provide the echo replica signal on lines 116a–116n by performing a correlation of the error signal on line 132 with the information present in the echo cancelers 108. The echo canceler output is illustratively $=\Sigma c_i^* x_i$, where c represents the filter coefficients and x represents the delayed samples of the non-linear waveform. The echo canceler update (the error signal on line 132 to be discussed hereafter) may be $c_i +=\Sigma e_i^* x_{i-N}$ for N samples, where c represents the filter coefficients, e represents the error samples, x represents the delayed samples of the non-linear waveform, and N represents the number of samples of delay from the output of echo canceler 108. This includes the delay through LPF 121, DAC 111, plus any delay in hybrid transformer 136, analog to digital converter (ADC) 128, plus the delay of LPF 129. This indicates that an echo replica was generated in echo cancelers 108 and received back to the echo cancelers 108 after passing through the aforementioned elements, the time delay being N as referenced above.

Adder 118 adds the echo replica signals from echo cancelers 108a–108n and supplies the total echo replica signal on line 119 to low pass filter 121. Low pass filter 121 filters the echo replica signal in the digital domain and outputs a filtered echo replica signal on line 122. The echo replica signal on line 122 is subtracted in subtractor 109 from the Hilbert filter 101 output on line 104. Optionally, delay element 137 can be installed in line 104 to adjust the phase of the Hilbert filter 101 output relative to the echo replica signal on line 122 to compensate for the delay in the echo cancelers 108. Delay element 137 is a conventional digital delay element having the delay characteristic of $Z^{-M}$.

The result is an output signal on line 124 that compensates for the low frequency harmonic distortion present on the line and is supplied to digital to analog converter (DAC) 111 for conversion to the analog domain for transmission over communication channel 34.

Hybrid transformer 136, which is used to connect remote device 38 to communications channel 34, operates as is known in the art. Telephone 17, which represents a conventional telephone, is connected to communications channel 34 through communication bus 39. The received signal on line 127 illustratively includes audible harmonic distortion generated by telephone 17.

In the absence of a POTS splitter, or other isolation device, any non-linear harmonic distortion generated by telephone 17, or other devices, will be allowed to leak into the communication path and be heard as audible distortion to a telephone user. The distortion also degrades performance of remote device 38 during data communication operation and will prevent remote device 38 from operating optimally. The concepts and features of the audio distortion canceler method and apparatus allow remote device 38 to operate optimally and cancel any non-linear harmonic distortion caused by telephone 17 without the use of a POTS splitter or other isolation device.

Still referring to FIG. 4, the received signal on line 127, which contains both non-linear low frequency harmonic distortion from telephone 17 and a higher frequency data communication signal, is supplied to ADC 128, which converts the received signal to the digital domain. The output of ADC 128 on line 131 is supplied to receiver 43, which processes the signal to extract the data contained within the signal and will not be discussed herein in detail.

The received signal on line 131 is also supplied to low pass filter (LPF) 129. LPF 129 operates on the received signal to develop the error signal on line 132 used to update the filter coefficients of echo cancelers 108 as described herein. The error signal on line 132, while a scalar in this preferred embodiment, can also be a multidimensional signal.

Figure 5:
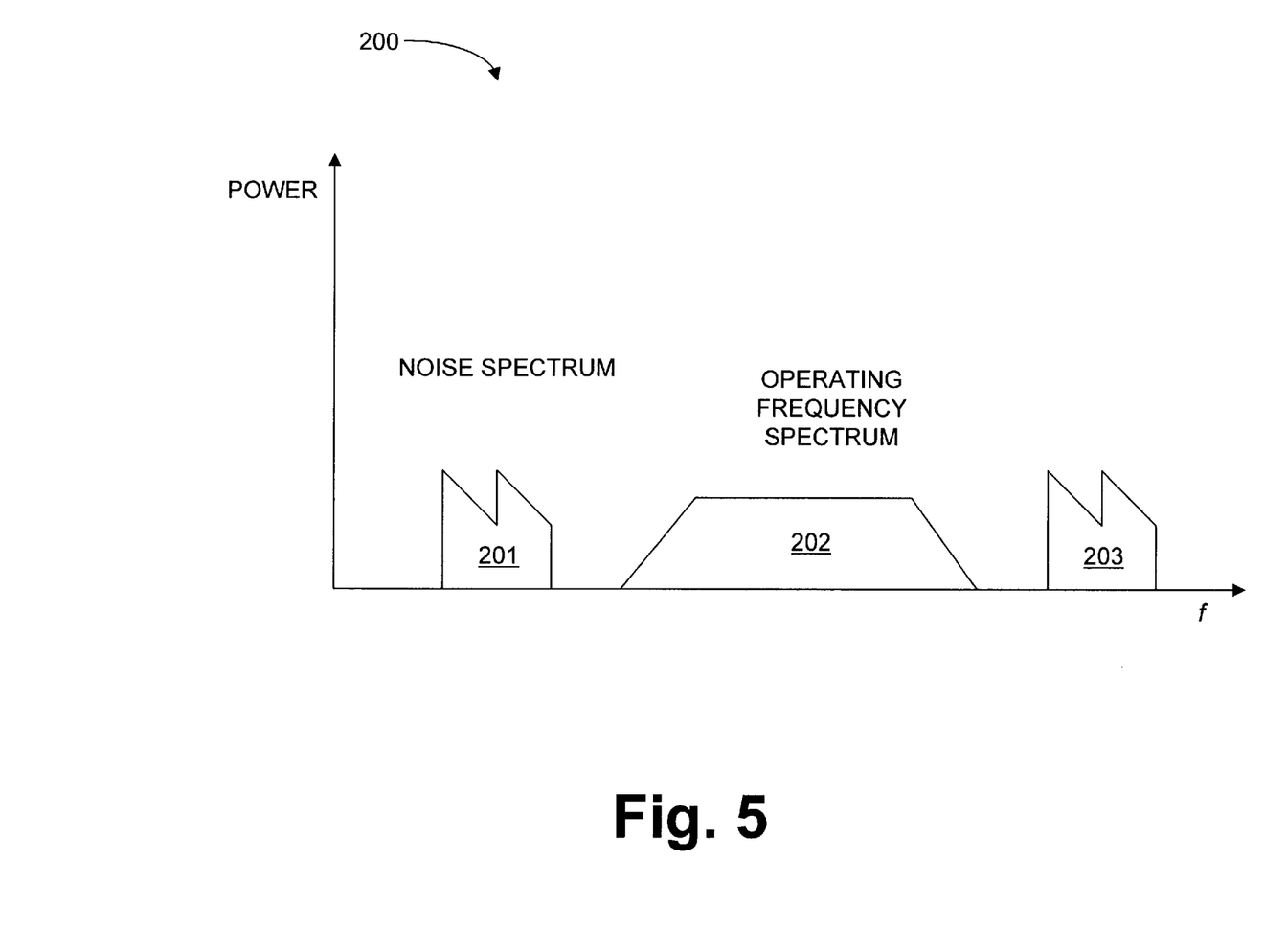
FIG. 5 is a view illustrating the frequency spectrum in which the preferred embodiment of the audio distortion canceler apparatus of FIG. 4 operates.

Referring now to FIG. 5, shown is a view illustrating frequency spectrum 200 in which the preferred embodiment of the audio distortion canceler method and apparatus of FIG. 4 operates. Section 201 illustrates the low frequency distortion component of the received signal, the distortion generated by telephone 17, while section 202 illustrates the higher frequency data communications signal. Illustratively, the audio distortion canceler method and apparatus 100 operates to cancel the low frequency audio distortion component 201, while allowing the higher frequency data communication signal 202 to pass. Alternatively, the audio distortion canceler method and apparatus can be used to cancel any distortion 203 that is present outside of the frequency band represented by section 202.

Operation

Figure 6A:
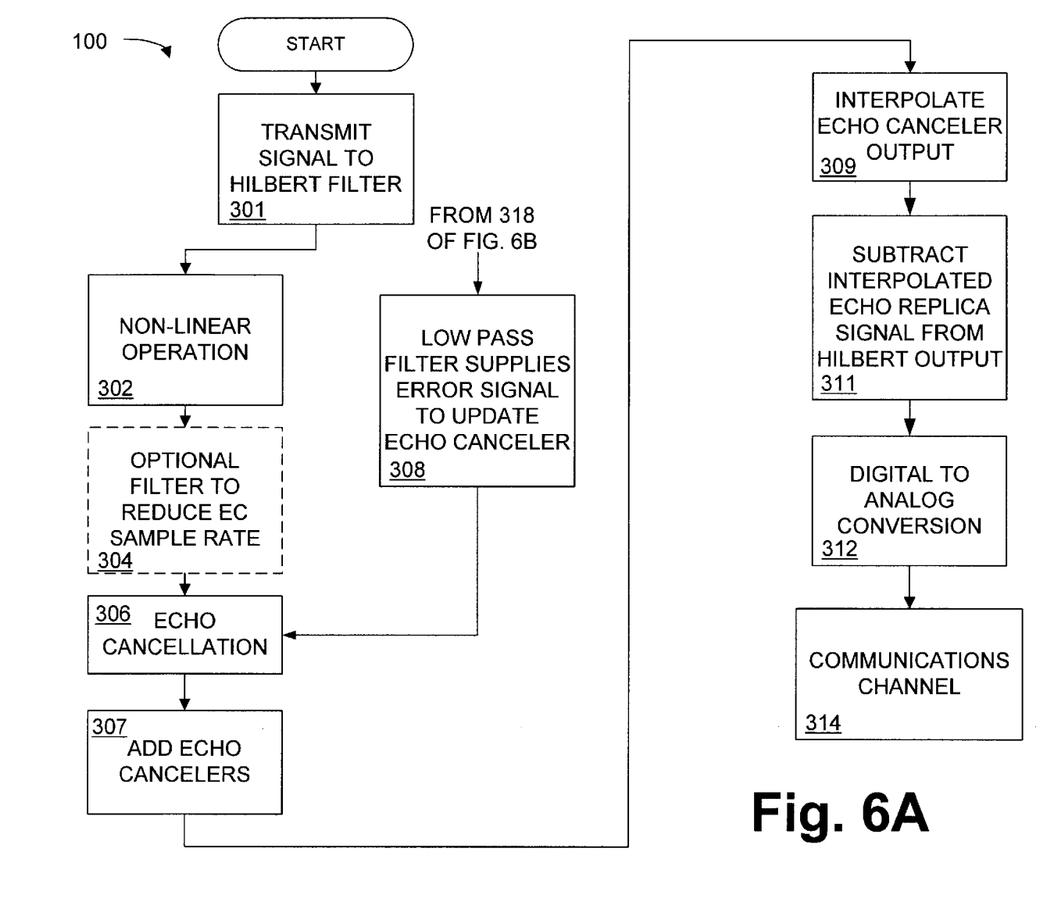
FIGS. 6A and 6B collectively illustrate, in flow charts, the operation of the audio distortion canceler apparatus of FIG. 4.
Figure 6B:
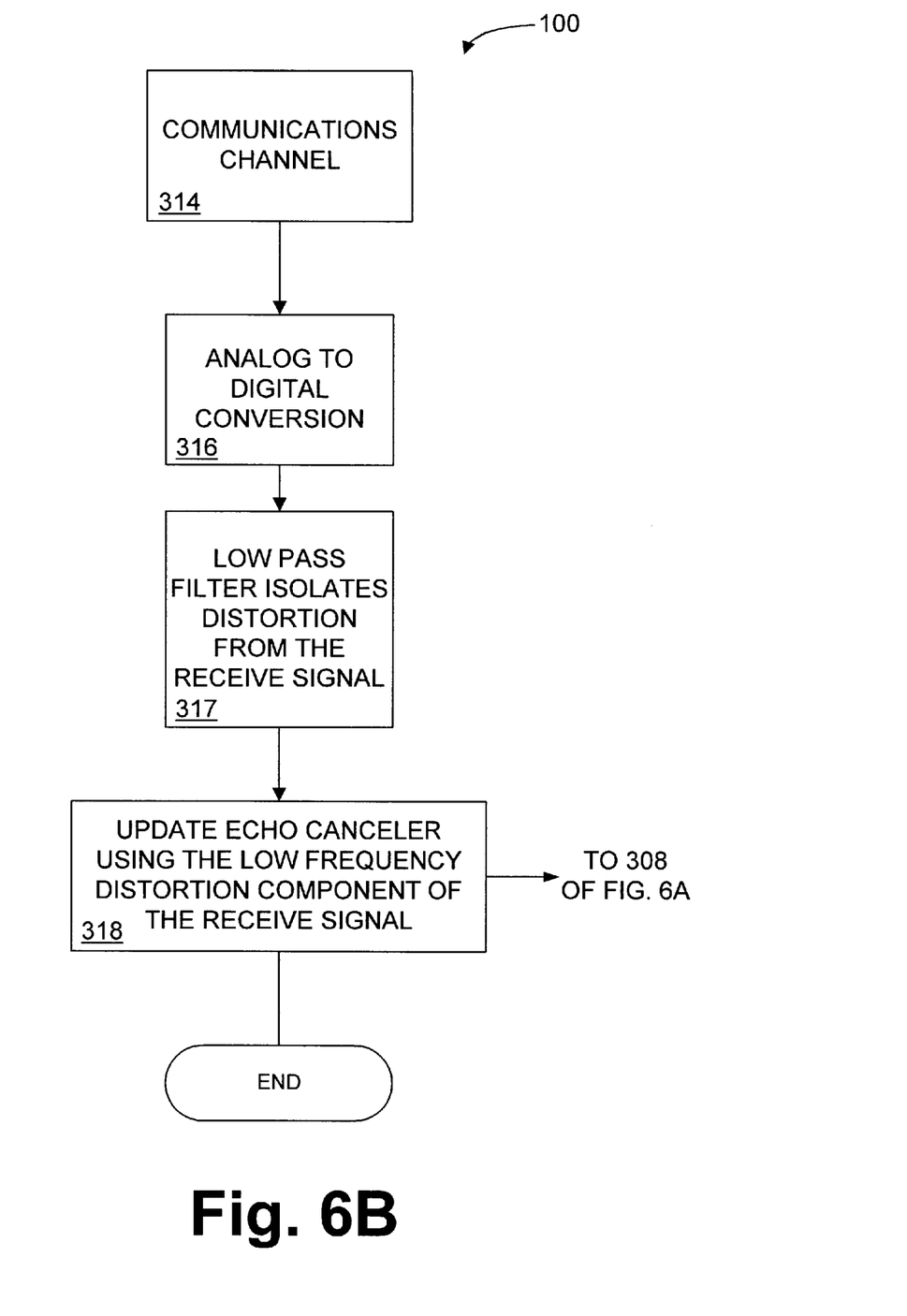

With reference now to FIGS. 6A and 6B, shown are flow charts 100 collectively illustrating the operation of the audio distortion canceler method and apparatus 100 of remote device 38 of FIG. 3.

As indicated at block 301, a transmit signal is supplied to Hilbert filter 101 (or another type of modulator, such as, for example, a quadrature amplitude modulator (QAM)).

In block 302, a non-linear operator operates on the Hilbert filter output to obtain the harmonic content of the signal, which would produce intermodulation products in the low frequency band where they are audible.

In block 304, an optional filter reduces the signal sample rate, which allows the echo cancelers 108 to run at a reduced sample speed by reducing the sample rate of the Hilbert filter 101 output.

In block 306, the echo cancelers develop an echo replica signal.

In block 307, the echo canceler outputs are added together forming a combined echo replica signal for input to low pass filter.

In block 308, low pass filter 129 supplies the error signal 132 used to update echo cancelers 108.

In block 309, low pass filter 121 filters the echo replica signal received from adder 118 in the digital domain and supplies a filtered echo replica signal to subtractor 109.

In block 311, the echo replica signal on line 122 is subtracted from the Hilbert filter output on line 104.

In block 312, the error corrected signal on line 124 is converted to the analog domain by DAC 111 and is supplied to communication channel 34 through hybrid transformer 136 in block 314.

Referring now to FIG. 6B, shown is flow chart 100 further illustrating the operation of the audio distortion canceler method and apparatus 100 of remote device 38 of FIG. 3.

As indicated in block 314, communication channel 34 supplies a received signal to hybrid transformer 136. Hybrid transformer 136 supplies the received signal to ADC 128. The received signal includes audible harmonic distortion generated by telephone 17.

In block 316, the received signal undergoes conventional analog to digital conversion.

In block 317, the digital received signal containing both communications data and low frequency harmonic distortion caused by telephone 17 connected to communications channel 34 is low pass filtered by low pass filter 129 in order to isolate the low frequency harmonic distortion from the communications data. The result of the operation of block 317 is an error signal that is supplied to echo cancelers 108.

In block 318, echo cancelers 108 are updated using the error signal developed using the low frequency harmonic distortion component of the received signal.

The operation described above allows the audio distortion canceler method and apparatus of the present invention to adaptively cancel, at the remote device non-linear harmonic distortion present on the communication path.

It will be obvious to those skilled in the art that many modifications and variations may be made to the preferred embodiments of the present invention, as set forth above, without departing substantially from the principles of the present invention. For example, it is possible to implement the present invention by using any number of non-linear devices and echo cancelers, or it is possible to adjust the characteristics of the non-linear devices, filters, and echo cancelers to reduce or eliminate any out of band distortion. Furthermore, it is possible to implement the present invention at either a remote location or a central office location. All such modifications and variations are intended to be included herein within the scope of the present invention, as defined in the claims that follow.

Therefore, the following is claimed:

1. A method for eliminating audible harmonic distortion in a communication device, comprising the steps of:

supplying a transmit signal to a modulator, said modulator designed to supply a modulated output;

supplying the output of said modulator to a non-linear device;

supplying the output of said non-linear device to an echo canceler;

supplying a received signal containing distortion to a first filter to obtain an error signal;

updating said echo canceler using said error signal, said echo canceler providing an echo replica signal;

filtering said echo replica signal in a second filter to obtain a filtered echo replica signal; and subtracting said filtered echo replica signal from the output of said modulator to obtain an error corrected signal.

2. The method of claim 1, wherein said echo canceler operates at a sample rate equal to the symbol rate of the modulator.

3. The method of claim 1, wherein said echo canceler operates at a sample rate below that of the symbol rate of the modulator.

4. The method of claim 1, wherein said transmit signal can originate in any transmitter that provides a transmit signal that is apart from another part of the frequency spectrum that is likely to contain a harmonic distortion component.

5. The method of claim 1, wherein said modulated output is a digital signal.

6. The method of claim 1, wherein said modulated output is an analog signal.

7. The method of claim 1, further comprising the step of supplying the output of said non-linear device to an additional filter, said additional filter configured to supply an output to said echo canceler.

8. The method of claim 7, wherein said first filter, said second filter and said additional filter are low pass filters.

9. An apparatus for eliminating audible harmonic distortion in a communication device, comprising:

a modulator having a modulated output;

a non-linear device configured to receive the output of said modulator;

an echo canceler configured to receive the output of said non-linear device and output an echo replica signal;

a first filter configured to supply an error signal to said echo canceler;

a second filter configured to filter the output of said echo canceler; and a subtractor configured to subtract the output of said second filter from the output of said modulator.

10. The apparatus of claim 9, wherein said echo canceler operates at a sample rate equal to the symbol rate of the modulator.

11. The apparatus of claim 9, wherein said echo canceler operates at a sample rate below that of the symbol rate of the modulator.

12. The apparatus of claim 9, wherein said transmit signal can originate in any transmitter that provides a transmit signal that is apart from another part of the frequency spectrum that is likely to contain a harmonic distortion component.

13. The apparatus of claim 9, wherein said modulated output is a digital signal.

14. The apparatus of claim 9, wherein said modulated output is an analog signal.

15. The apparatus of claim 9, further comprising a third filter configured to receive the output of said non-linear device and configured to supply an output to said echo canceler.

16. The apparatus of claim 15, wherein said first, second, and third filters are low pass filters.

17. A computer readable medium having a program for eliminating audible harmonic distortion in a communication device, the program comprising:

means for supplying a transmit signal to a modulator, said modulator designed to supply a modulated output;

means for supplying the output of said modulator to a non-linear device;

means for supplying the output of said non-linear device to an echo canceler;

first means for filtering a received signal containing distortion to obtain an error signal;

means for updating said echo canceler using said error signal, said echo canceler providing an echo replica signal;

second means for filtering said echo replica signal to obtain a filtered echo replica signal; and means for subtracting said filtered echo replica signal from the output of said modulator to obtain an error corrected signal.

18. The program of claim 17, wherein said echo canceler operates at a sample rate equal to the symbol rate of the modulator.

19. The program of claim 17, wherein said echo canceler operates at a sample rate below that of the symbol rate of the modulator.

20. The program of claim 17, wherein said transmit signal can originate in any transmitter that provides a transmit signal that is apart from another part of the frequency spectrum that is likely to contain a harmonic distortion component.

21. The program of claim 17, wherein said modulated output is a digital signal.

22. The program of claim 17, wherein said modulated output is an analog signal.

23. The program of claim 17, further comprising means for supplying the output of said non-linear device to an additional filter means, said additional filter means configured to supply an output to said echo canceler.

24. The program of claim 23, wherein said first means for filtering, said second means for filtering and said additional filter means are low pass filters.

* * * * *